United States Patent
McCarthy, Jr. et al.

(10) Patent No.: US 12,104,542 B2
(45) Date of Patent: Oct. 1, 2024

(54) DIESEL ENGINE CYLINDER DEACTIVATION MODES

(71) Applicant: Eaton Intelligent Power Limited, Dublin (IE)

(72) Inventors: James E. McCarthy, Jr., Kalamazoo, MI (US); Matthew Pieczko, Mattawan, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/413,775

(22) PCT Filed: Dec. 13, 2019

(86) PCT No.: PCT/EP2019/025458
§ 371 (c)(1),
(2) Date: Jun. 14, 2021

(87) PCT Pub. No.: WO2020/119951
PCT Pub. Date: Jun. 18, 2020

(65) Prior Publication Data
US 2022/0065178 A1    Mar. 3, 2022

Related U.S. Application Data
(60) Provisional application No. 62/779,554, filed on Dec. 14, 2018.

(51) Int. Cl.
*F02D 13/06*   (2006.01)
*F02D 41/00*   (2006.01)
(Continued)

(52) U.S. Cl.
CPC .......... *F02D 13/06* (2013.01); *F02D 41/0087* (2013.01); *F02D 41/08* (2013.01);
(Continued)

(58) Field of Classification Search
CPC ...... F02D 13/06; F02D 41/0087; F02D 41/08; F02D 41/1498; F02D 2041/0012; F02D 2200/025; F02D 2200/101; Y02T 10/12
(Continued)

(56) References Cited

U.S. PATENT DOCUMENTS 4,172,434 A * 10/1979 Coles .................. F02D 41/1498
123/483
4,434,767 A *  3/1984 Kohama ............. F02D 41/0087
123/481

(Continued)

FOREIGN PATENT DOCUMENTS

DE    102013114956 A1    7/2014
EP        2123885 A1    11/2009
(Continued)

OTHER PUBLICATIONS

NPL Journal Article : Archer, A. and McCarthy Jr, J., "Quantification of Diesel Engine Vibration Using Cylinder Deactivation for ExhaustTemperature Management and Recipe for Implementation in Commercial Vehicles," SAE Technical Paper 2018-01-1284, 2018,doi:10.4271/2018-01-1284; Published Apr. 3, 2018 (Year: 2018).*

(Continued)

*Primary Examiner* — Phutthiwat Wongwian
*Assistant Examiner* — Susan E Scharpf
(74) *Attorney, Agent, or Firm* — Pearne & Gordon LLP

(57) ABSTRACT

When selecting cylinders of a multi-cylinder diesel engine in an engine system for cylinder deactivation (CDA), a method can comprise designating a first resonance around a first periodic frequency output of the engine system as a primary boundary and designating a second resonance around a second periodic frequency output of the engine system as a secondary boundary. Selecting cylinders can comprise (Continued)

selecting one of half, one third, or two thirds of the multiple cylinders for CDA while firing the remaining multiple cylinders. The selection can be made so that the periodic frequency output of the engine is between the primary and secondary boundaries. A compact periodic frequency band can be implemented to further restrict the selection of cylinders for CDA. The first periodic frequency output can be about 15 Hertz+/−1.5 Hertz and the second periodic frequency output can be between 30-40 Hertz+/−1.5 Hertz.

24 Claims, 13 Drawing Sheets

(51) Int. Cl.
    F02D 41/08      (2006.01)
    F02D 41/14      (2006.01)
(52) U.S. Cl.
    CPC .. *F02D 41/1498* (2013.01); *F02D 2041/0012* (2013.01); *F02D 2200/025* (2013.01); *F02D 2200/101* (2013.01)
(58) Field of Classification Search
    USPC .................................................... 123/198 F
    See application file for complete search history.

(56) References Cited

U.S. PATENT DOCUMENTS

| | | | | |
|---|---|---|---|---|
| 4,640,241 | A * | 2/1987 | Matsunaga | F02D 41/0087 123/357 |
| 4,745,553 | A * | 5/1988 | Raven | F02D 41/1406 123/436 |
| 5,495,907 | A * | 3/1996 | Data | B60L 50/10 180/65.245 |
| 5,813,383 | A * | 9/1998 | Cummings | F02D 41/0087 123/145 A |
| 5,868,116 | A * | 2/1999 | Betts | F02D 41/0087 73/114.25 |
| 6,009,857 | A * | 1/2000 | Hasler | F02D 17/02 123/481 |
| 6,247,449 | B1 * | 6/2001 | Persson | F02D 17/02 123/436 |
| 7,073,488 | B2 * | 7/2006 | Hasler | F02D 41/1497 123/481 |
| 7,212,900 | B2 * | 5/2007 | Dominici | F02D 41/008 701/111 |
| 9,382,853 | B2 * | 7/2016 | Phillips | F02D 17/02 |
| 9,441,551 | B2 * | 9/2016 | Boyer | F02B 75/20 |
| 9,587,567 | B2 * | 3/2017 | Mahadevan | F02D 41/0087 |
| 9,732,693 | B2 * | 8/2017 | Ozawa | F02D 41/008 |
| 10,006,379 | B2 * | 6/2018 | Rollinger | F01L 13/0005 |
| 10,233,796 | B2 * | 3/2019 | Shost | F01L 13/0026 |
| 2003/0084713 | A1 * | 5/2003 | Imoehl | F02B 77/04 73/114.38 |
| 2005/0131618 | A1 * | 6/2005 | Megli | F02D 13/0257 701/101 |
| 2005/0204726 | A1 * | 9/2005 | Lewis | F02D 13/06 60/285 |
| 2005/0205044 | A1 * | 9/2005 | Lewis | F02D 41/0002 123/198 F |
| 2005/0205045 | A1 * | 9/2005 | Michelini | F02D 13/06 123/198 F |
| 2006/0005802 | A1 * | 1/2006 | Lewis | F02D 13/0253 123/198 F |
| 2006/0231049 | A1 * | 10/2006 | Luercho | F01L 9/20 123/90.11 |
| 2006/0234829 | A1 | 10/2006 | Berger et al. | |
| 2007/0029713 | A1 * | 2/2007 | Shin | G05D 19/02 267/141 |
| 2008/0029057 | A1 * | 2/2008 | Hergart | F02D 17/02 123/481 |
| 2008/0154468 | A1 | 6/2008 | Berger et al. | |
| 2009/0292439 | A1 * | 11/2009 | Luken | F02D 17/02 701/102 |
| 2011/0029222 | A1 | 2/2011 | Luken et al. | |
| 2011/0208405 | A1 * | 8/2011 | Tripathi | F02D 41/1402 701/102 |
| 2011/0213540 | A1 * | 9/2011 | Tripathi | F02D 17/02 701/102 |
| 2013/0257049 | A1 * | 10/2013 | Taylor | H02P 9/006 290/43 |
| 2013/0333663 | A1 * | 12/2013 | Chen | F02D 13/06 123/334 |
| 2014/0014062 | A1 * | 1/2014 | Yacoub | F02D 13/0257 123/295 |
| 2014/0163841 | A1 * | 6/2014 | Sane | F02D 41/1461 701/104 |
| 2014/0216413 | A1 * | 8/2014 | Ozawa | F02D 41/008 123/478 |
| 2014/0261315 | A1 * | 9/2014 | Willard | F02D 35/025 123/349 |
| 2014/0309851 | A1 * | 10/2014 | Felber | F02N 11/106 701/33.9 |
| 2014/0360459 | A1 * | 12/2014 | Orban | F02D 17/026 123/294 |
| 2015/0123624 | A1 * | 5/2015 | Ookawa | F02D 41/1498 322/22 |
| 2015/0142291 | A1 * | 5/2015 | Lippitt | F01B 1/10 123/294 |
| 2015/0232103 | A1 * | 8/2015 | Phillips | F02D 29/02 477/168 |
| 2015/0260117 | A1 * | 9/2015 | Shost | F02D 41/0087 123/481 |
| 2015/0285163 | A1 * | 10/2015 | Kemmerling | F02M 26/01 60/602 |
| 2015/0330500 | A1 * | 11/2015 | Sujan | F16H 61/0213 701/55 |
| 2015/0369140 | A1 | 12/2015 | Wagh et al. | |
| 2016/0061069 | A1 * | 3/2016 | Grosch | F01L 13/0047 123/90.15 |
| 2016/0195031 | A1 * | 7/2016 | Willems | F02D 41/0082 123/52.1 |
| 2016/0252033 | A1 * | 9/2016 | Dye | F02D 41/3005 123/481 |
| 2017/0002772 | A1 * | 1/2017 | Perfetto | F02B 37/025 |
| 2017/0058803 | A1 * | 3/2017 | Nieman | F02D 41/0097 |
| 2017/0159581 | A1 * | 6/2017 | McCarthy, Jr. | F02B 3/06 |
| 2017/0306859 | A1 * | 10/2017 | Tatavarthi | F02D 13/0207 |
| 2017/0335815 | A1 * | 11/2017 | Burrahm | F02N 11/003 |
| 2017/0350331 | A1 * | 12/2017 | Shost | F02D 41/0087 |
| 2017/0350333 | A1 | 12/2017 | Glugla et al. | |
| 2017/0370301 | A1 * | 12/2017 | Srinivasan | F02D 41/2422 |
| 2017/0370371 | A1 * | 12/2017 | Banker | F04D 27/023 |
| 2018/0328292 | A1 | 11/2018 | Srinivasan et al. | |
| 2019/0063337 | A1 * | 2/2019 | Inoue | F02D 41/0087 |
| 2019/0107065 | A1 | 4/2019 | Stretch | |
| 2019/0178168 | A1 | 6/2019 | McCarthy, Jr. et al. | |
| 2019/0376459 | A1 | 12/2019 | Pieczko et al. | |
| 2020/0123988 | A1 | 4/2020 | Archer et al. | |

FOREIGN PATENT DOCUMENTS

| | | |
|---|---|---|
| EP | 2716898 A1 | 4/2014 |
| WO | WO-2017/127219 A1 | 7/2017 |
| WO | WO-2018/005711 A1 | 1/2018 |
| WO | WO-2018035302 A1 | 2/2018 |
| WO | WO-2018/235023 A1 | 12/2018 |

OTHER PUBLICATIONS

Zhu, Jin, et al. "Dynamic Analysis of an Engine Chassis Mount Bracket Using the Finite Element Method." SAE Transactions, vol. 97, 1988, pp. 1750-1758. JSTOR, http://www.jstor.org/stable/44547494. Accessed May 15, 2023. (Year: 1988).*

"Downsizing on demand: Ford eyes EcoBoost evolution with cylinder deactivation tech", Author Chris Pickering, published to the internet Feb. 27, 2017; Retrieved Nov. 15, 2023; URL: https://

(56) References Cited

OTHER PUBLICATIONS www.theengineer.co.uk/content/in-depth/downsizing-on-demand-ford-eyes-ecoboost-evolution-with-cylinder-d (Year: 2017).*

International Search Report and Written Opinion for PCT/EP2019/025458, mailed Mar. 13, 2020; pp. 1-13.

International Search Report and Written Opinion for PCT/IB2018/054561, mailed Oct. 15, 2018 pp. 1-13.

Dr. Cody Allen, Eaton Corporation. CDA versus Cylinder Cutout: A Technology Overview. A Presentation dated Oct. 28, 2020, Last Accessed Feb. 23, 2024. Retrieved from the Internet <URL: https://www.eaton.com/us/en-us/products/engine-solutions/valve-and-valve-actuation/diesel-cylinder-deactivation-webinars.html>.

* cited by examiner

DIESEL ENGINE CYLINDER DEACTIVATION MODES

This is a US § 371 National Stage Entry of PCT/EP2019/025458 filed Dec. 13, 2019, and claims the benefit of U.S. provisional application 62/779,554 filed Dec. 14, 2018 all of which are incorporated herein by reference.

FIELD

This application provides systems and methods for implementing cylinder deactivation modes in diesel engine systems.

BACKGROUND

Various techniques for cylinder deactivation in gasoline engines exist. Those gasoline engine techniques are not readily usable in diesel engine systems for a variety of reasons. Yet, there is a long-felt need in the art to implement cylinder deactivation in diesel engine systems regardless of the size or purpose of the system and regardless of the engine output capacity.

SUMMARY

Inventors herein have found that the techniques used for implementing cylinder deactivation modes ("CDA") in gasoline engines are not readily transferrable to diesel engines. And diesel engine systems have considerations for CDA that are non-issues in gasoline engine systems. Reasons for this include that the engines run at different rotations per minute of the crankshaft for loaded, unloaded, idle, cruising, and other operation modes. And, the engines have different forces as fuel is combusted, among other reasons. The differences yield noise, vibration, and harshness ("NVH") in diesel engine systems that are unlike the NVH encountered in gasoline engine systems. So, while commercial embodiments of gasoline cylinder deactivation exist, there is a great desire to commercially implement cylinder deactivation in diesel engine systems. So, while gasoline and diesel engines are both combustion engines, the methodologies and factors for implementing cylinder deactivation modes are disparate.

The methods and systems disclosed herein provide cylinder deactivation modes for diesel engine systems. Entering cylinder deactivation mode comprises deactivating fuel injection to at least one cylinder and deactivating intake valve actuation and exhaust valve actuation to the at least one cylinder. The methods provide a solution to a long felt and unsolved problem encountered when implementing CDA on diesel engines. The methods disclosed herein are particularly applicable to diesel engines of the in-line type. Regardless of the engine size (4 L, 6 L, 8 L, 10 L, among others) and regardless of the engine system (line-haul, off-road, heavy duty, light duty), it is possible to select an engine operation mode with acceptable NVH, and the engine operation mode can comprise CDA within certain boundaries. Unlike prior art systems, which adjust the receiver of the NVH (drivetrain, clutch, dampers, mounts, etc.), the systems and methods disclosed herein adjust the source of the NVH (engine operation) so that the receiver does not require excessive modification to switch from 6 cylinder firing mode to half-engine, ⅓ engine, or ⅔ engine firing modes.

When selecting cylinders of a multi-cylinder diesel engine in an engine system for cylinder deactivation (CDA), a method can comprise designating a first resonance around a first periodic frequency output of the engine system as a primary boundary and designating a second resonance around a second periodic frequency output of the engine system as a secondary boundary. Selecting cylinders can comprise selecting one of half, one third, or two thirds of the multiple cylinders for CDA while firing the remaining multiple cylinders. The selection can be made so that the periodic frequency output of the engine is between the primary and secondary boundaries. A compact periodic frequency band can be implemented to further restrict the selection of cylinders for CDA. The first periodic frequency output can be about 15 Hertz+/−1.5 Hertz and the second periodic frequency output can be between 30-40 Hertz+/−1.5 Hertz.

An additional method for compensating for engine roll in an in-line multiple-cylinder diesel combustion engine system can consist or comprise, when an in-line multiple-cylinder diesel combustion engine in the engine system is operating at an engine speed at or above idle, as by rotating a crankshaft connected to pistons in the in-line multiple-cylinders, implementing a cylinder deactivation mode comprising a periodic frequency output at a flywheel connected to the crankshaft above about 15 Hertz+/−1.5 Hertz and below about 30-40 Hertz+/−1.5 Hertz or else selecting a full cylinder firing mode.

An additional method for compensating for engine roll in an in-line multiple-cylinder diesel combustion engine system can consist or comprise, when the in-line four-cylinder diesel combustion engine is operating at an engine speed above 900 rotations per minute of a crankshaft connected to pistons in the four cylinders, implementing a half-engine cylinder deactivation mode comprising a periodic frequency output at a flywheel connected to the crankshaft above about 15 Hertz and below about 25 Hertz or else selecting a four cylinder firing mode.

An additional method of selecting cylinders of a multi-cylinder diesel engine in an engine system for deactivation, or an additional method of implementing cylinder deactivation on cylinders of a multi-cylinder diesel engine in an engine system can comprise designating a first resonance around a first periodic frequency output of the engine system as a primary boundary, designating a second resonance around a second periodic frequency output of the engine system as a secondary boundary, and selecting cylinders for cylinder deactivation so that the periodic frequency output of the engine is within a compact periodic frequency band between the primary boundary and the secondary boundary.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "up" or "down" are for ease of reference to the figures. Where an example method of acceleration is given, it is to be understood that the reverse of the method can be accomplished for deceleration and vice versa.

Figure 2:
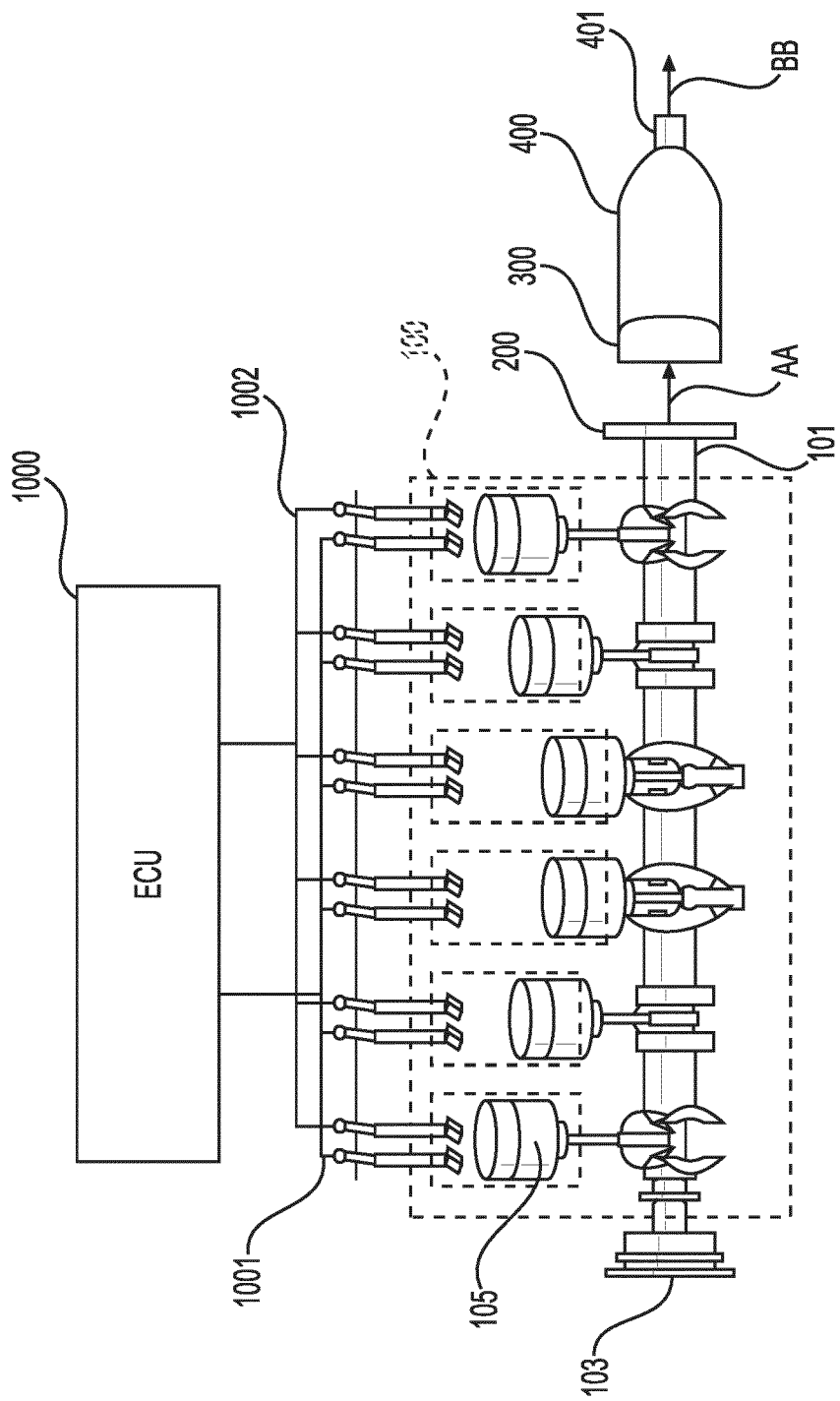
FIG. 2 is a schematic of an exemplary in-line diesel engine and cylinder deactivation mode subsystem.
Figure 3A:
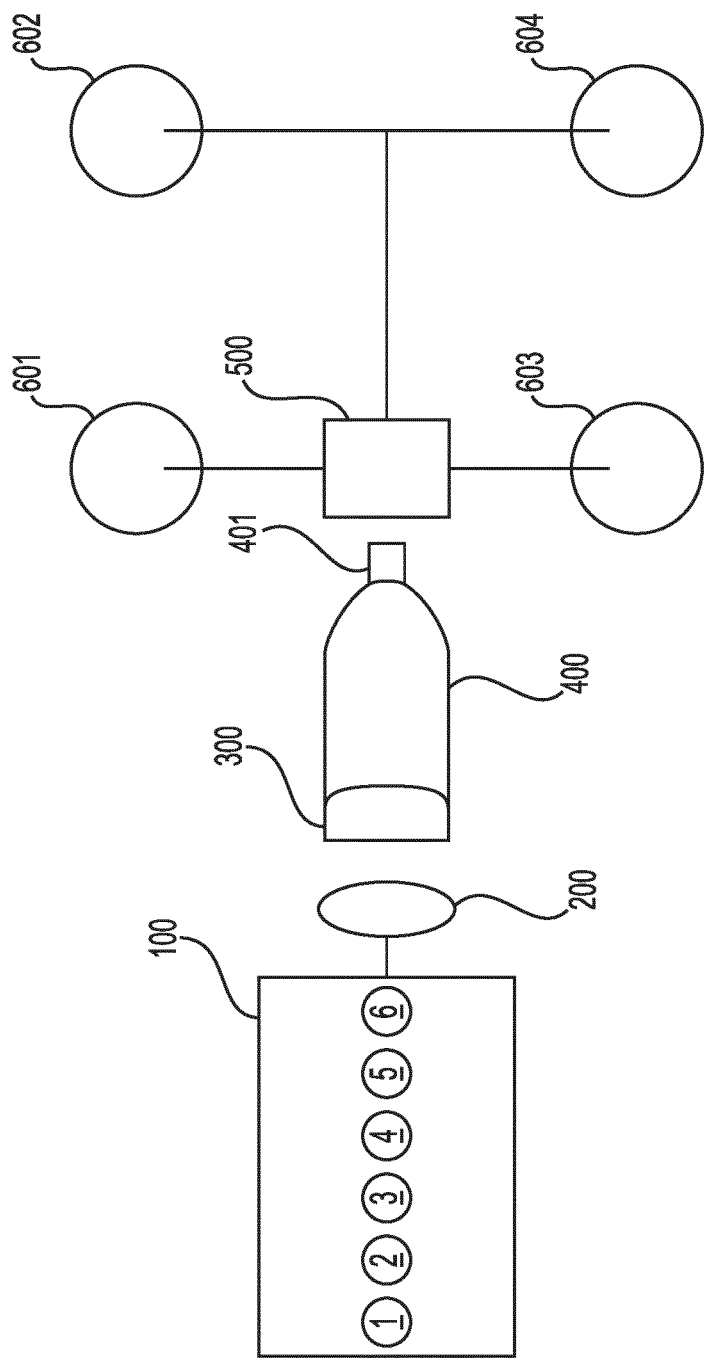
FIGS. 3A & 3B are schematics of exemplary in-line diesel engine systems.
Figure 3B:
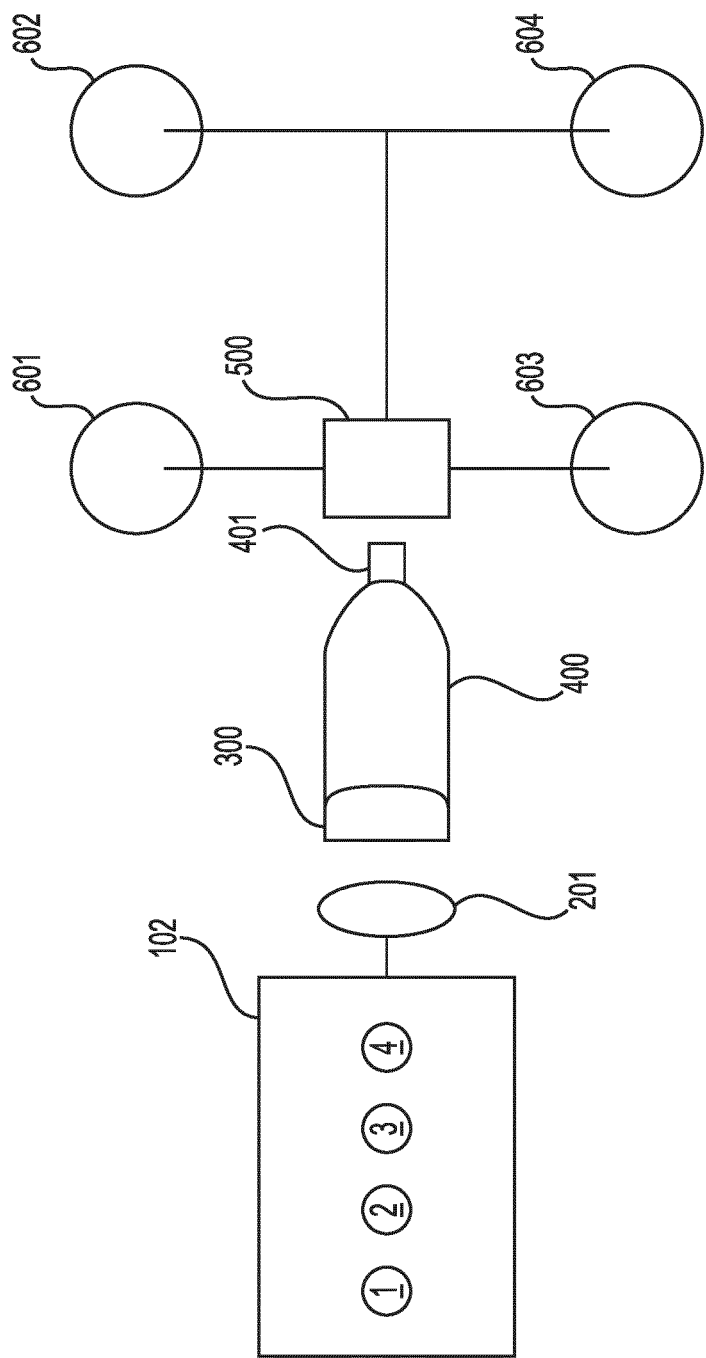

Diesel engines and diesel engine systems are described in FIGS. 2, 3A, & 3B for enabling the methods disclosed herein.

A diesel engine system can comprise a variety of machines, such as light duty trucks, buses, medium duty or heavy duty vehicles, off-road vehicles, earth-moving equipment and the like. While the disclosed 6-cylinder engine 100 and 4-cylinder engine 102 can be scaled for engine size, and while the principles can be adapted for other numbers of cylinders, such as 8 cylinders, the brevity of the disclosure is maintained by looking to a 6-cylinder engine 100 having 6 cylinders 1-6, and by looking to a 4-cylinder engine 102 having 4 cylinders 1-4. In FIG. 2, Pistons 105 reciprocate in respective cylinders 1-6. A crankshaft 101 is coupled via pivoting mechanisms and counterweights to each piston 105. The pistons 105 are arranged on the crankshaft 101 to provide firing periods and firing frequencies as shown in Table 1. A flywheel 200 is coupled to one end of the crankshaft 101 and a pully hub 103 or the like is at a second end of the crankshaft 101. The pulley hub 103 can be coupled to other engine parts, such as one or more cam rail for actuating the valves.

TABLE 1

| CYLINDER MODE | FIRING PERIODS PER 2 CRANKSHAFT REVOLUTIONS (720 DEGREES) | FIRING FREQUENCY; FIRINGS PER 2 CRANKSHAFT REVOLUTIONS (720 DEGREES) |
|---|---|---|
| NORMAL (ALL CYLINDERS) FIRING | 6 | 6 |
| 3-CYLINDER CDA | 3 | 3 |
| 2-CYLINDER CDA | 2 | 4 |
| 4-CYLINDER CDA | 2 | 2 |

The valves can be connected to an electronic control unit ("ECU") 1000 for implementing variable valve actuation techniques such as cylinder deactivation, engine braking, late or early valve opening or closing, among others. ECU 1000 comprises at least a processor, memory device, and algorithms for implementing the methods disclosed herein. ECU comprises additional connectivity for sensing engine operation, such as a synchronous sensor on or near the flywheel or equivalent engine speed sensor for collecting engine speed data. Engine speed data can be used for various purposes, including active engine control and failsafe engine control. So, ECU 1000 can comprise computational and processing capabilities to collect and process real-time data and to execute commands based on stored data. For example, a look-up table (LUT) can be used for correlating engine speed to one or more of firing frequency, load on the machine, torque output of the engine, cylinder deactivation mode, among others.

Since ordinal (primary, secondary, tertiary) powertrain resonant frequencies occur at machine-specific firing frequencies across all engine speeds, the methods herein can comprise sensing engine speed (via direct detection, derivation from other sensed parameters, or approximation techniques) during machine operation and to distinguish, via lookup or real time computation, when the engine is outputting deleterious NVH. The engine speeds can be processed in the ECU 1000 and the algorithms stored therein can be configured to implement the methods disclosed herein.

Engine frequency content does not relate to the number of cylinders firing per crankshaft revolution. Rather, the frequency corresponds to the number of periods (smallest repeating firing pattern) that occurs per crankshaft revolution. To define periodic frequency, one must establish the definition of periodic order. Periodic order is determined from the number of periods (period defining the smallest repeating firing pattern) per crankshaft revolution. The periodic frequency can then be defined by knowing the periodic order and the following equation:

$$\text{Periodic frequency}=(\text{rpm}/60)*\text{periodic order} \qquad \text{eq. 1}$$

On the other hand, firing frequency is a more commonly used industry term. The number of firing events per crankshaft revolution determines the "firing order," which can generate a firing frequency result in a similar fashion according to equation 2:

$$\text{Firing frequency}=(\text{rpm}/60)*\text{firing order} \qquad \text{eq. 2}$$

For the instance of one third cylinders firing (2 CF), both calculations generate the same result of periodic order=firing order=1. For the instance of one half cylinders firing (3 CF), both calculations generate the same result of periodic order=firing order=1.5. For the instance of two thirds cylinders firing (4 CF), the calculations deviate. Periodic order=1 while firing order=2.

From experimental data we have determined that the periodic order properly describes the frequency output of the engine when operating in cylinder deactivation mode, and thus the "periodic frequency" will be used in the FIGS. 1A-1D, 7A, & 7B.

Diesel engines 100, 102 are configured to implement cylinder deactivation of select cylinders. Entering cylinder deactivation (CDA) mode comprises deactivating fuel injection to at least one cylinder and deactivating intake valve actuation and exhaust valve actuation to the at least one cylinder. All-cylinder deactivation is also contemplated, and the full-firing operation of all 6 cylinders 1-6 is enabled. In these examples, the all-cylinder mode of operation is available at all engine speeds, and the engine system is designed to receive the frequency outputs of the all-cylinder firing mode. As a failsafe, the methods can be such that all-cylinder operation is selected should any CDA mode fail to be selected or implemented. The diesel engine 100 comprises multiple combustion cylinders 1-6, reciprocating pistons 105 for reciprocating in the combustion cylinders 1-6, a crankshaft 101 coupled to the reciprocating pistons 105, a flywheel 200, at least one fuel injector for each combustion cylinder 1-6 for selectively injecting fuel in to the combustion cylinders, controllable intake valves connected to intake valve bus 1001 configured for selective opening and closing for controlling intake of charge air to the combustion cylinders, controllable exhaust valves connected to exhaust valve bus 10002 configured for selective opening and closing for controlling exhaust of fluid from the combustion cylinders, and a control system comprising the ECU 1000, the ECU 1000 comprising at least a processor, a memory device, and processor-executable instructions stored in the memory device. The processor-executable instructions are configured for implementing the methods disclosed herein.

In FIG. 3B, the diesel engine 102 is configured to an engine system, here a vehicle driveline, similarly to the 6-cylinder diesel engine 100 of FIG. 3A, but diesel engine 102 has only four cylinders 1-4. Both diesel engines 100, 102 are shown as in-line, meaning the cylinders are aligned over the crankshaft 101. Both diesel engines can have, as depicted in FIG. 2, an electronics control unit ECU 1000 and control busses 1001, 1002, with appropriate reduction in parts for the 4-cylinder engine.

An intake valve control bus 1001 can connect to the intake valves to control actuators for opening or closing the intake valves. Likewise, an exhaust valve control bus 1002 can connect to the exhaust valves to control actuators for opening or closing the exhaust valves. An additional control bus can be included for controlling fuel injection to the cylinders.

The flywheel 200 outputs torque from the engine 100, 102 to power the engine system. The torque is transferred from the flywheel 200 to, for example, a clutch 300 and transmission 400. An output shaft 401 of the transmission can couple directly to, or be configured to selectively couple as by a power take off ("PTO") unit 500, to a vehicle driveline or other torque device. The vehicle driveline can comprise a main axle and additional axles connecting wheels 601-604 thereto. The engine system is not limited to 4-wheeled devices and the machine can comprise more or less wheels, such as an 18-wheeler tractor trailer, a 6-wheeled sleeper cab, an earth mover, a diesel machine, among others.

The radian per second squared (symbolized rad/sec$^2$ or rad/s$^2$) is the unit of angular (rotational) acceleration magnitude in the International System of Units. Two instances of angular acceleration magnitude are shown in FIG. 3, at arrow AA and arrow BB. The arrows represent the rate of change of angular speed of the flywheel 200 and transmission output shaft 401, respectively. The angular acceleration vector has a direction component that can be defined as either counterclockwise or clockwise.

In the above discussion, an output represented by arrow AA of 500 rad/sec2 at the flywheel 200 can drop to an output represented by arrow BB of 300 rad/sec2 at the transmission output shaft 401. The force on the driveline causes noise, vibration, and harshness (NVH) on the driveline. At key frequencies, resonance can occur. First order resonance is the most severe resonance as far as user experience and can have deleterious effects on the vehicle. Most machine manufacturers focus on damping and accounting for the first order resonance. Additional orders of resonance, such as half order, second order, tertiary order, among others, can occur. The methods herein are devised to operate above the first order resonance, herein the primary resonant frequency. This primary resonant frequency can occur in most systems around 15 Hertz, plus or minus 1.5 Hertz. And, this primary resonant frequency is depicted in FIGS. 1A-1D, 7A & 7B. However, there are systems where this primary resonant frequency can occur around 9 Hertz, plus or minus 1.5 Hertz. For example, changing the number of engine mounts, the engine mount stiffness, the driveline length, or cab mounts, among others, can adjust the primary resonant frequency between 9 Hertz or 15 Hertz, and vehicle-to-vehicle variations can result in fluctuations from the mean so as to lead to a +/−1.5 Hertz band to avoid during implementation. Likewise, the secondary and tertiary resonant frequencies can deviate from vehicle to vehicle, yet still fall within the claims herein.

A long felt need in the art of diesel engines has been to use cylinder deactivation techniques despite the existing first and other order resonances of the vehicle. The techniques disclosed herein improve the field of diesel engine cylinder deactivation techniques by formulating methods for implementing cylinder deactivation without re-designing the clutch, transmission, or other driveline components and without adding expensive dampers above and beyond those already existing on the machine. The methods herein adjust the source of the NVH (the engine operation) to operate within the pre-engineered parameters of the receiver (driveline or other torque receiving system). This is a departure from changing the receiver to accommodate each and every peculiarity of the source. Design changes can be made to the receiver without departing from the scope herein. As above, changes to the mounts, driveline length, etc. can move the exact location of ordinal resonance frequencies for the engine system and these changes are within the scope of the disclosure.

When selecting cylinders of a multi-cylinder diesel engine in an engine system for cylinder deactivation (CDA), a method can comprise designating a first resonance around a first periodic frequency output of the engine system as a primary boundary and designating a second resonance around a second periodic frequency output of the engine system as a secondary boundary. Selecting cylinders can comprise selecting one of half, one third, or two thirds of the multiple cylinders for CDA while firing the remaining multiple cylinders. The selection can be made so that the periodic frequency output of the engine is between the primary and secondary boundaries. A tertiary boundary can also be included. A compact periodic frequency band can be implemented to further restrict the selection of cylinders for CDA. The first periodic frequency output can be about 15 Hertz+/−1.5 Hertz and the second periodic frequency output can be between 30-40 Hertz+/−1.5 Hertz. The boundaries can correspond to ordinal (primary, secondary, tertiary) powertrain resonant frequencies.

Figure 4A:
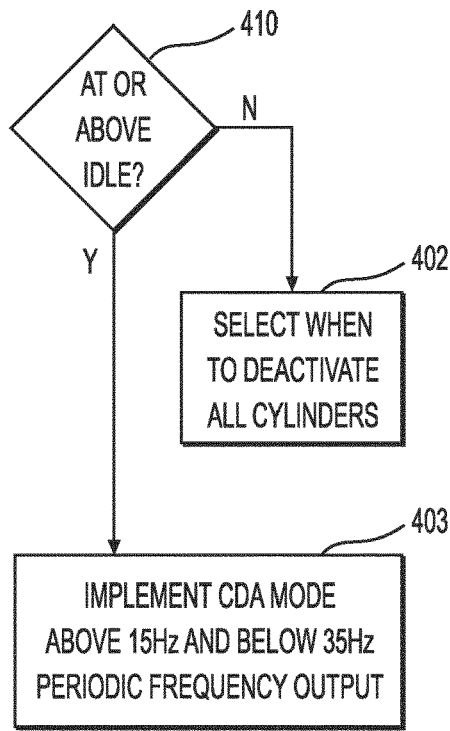
FIGS. 4A-4D are exemplary cylinder deactivation mode implementation strategies.

Turning to FIGS. 1A-1D, 7A, & 7B, a method for compensating for engine roll in an in-line multiple-cylinder diesel combustion engine system can be understood. It is important to devise methods that compensate for engine roll, as the inventors herein have discovered that this phenomenon is responsible for the most deleterious NVH issues when implementing CDA in a diesel engine system. Characterizing the NVH present in a diesel engine system and properly mitigating it has been a long-felt but unsolved need as to cylinder deactivation, but the inventors herein have discovered methods for using CDA that properly characterize and avoid deleterious NVH while applying acceptable levels of NVH when in active CDA modes. Mitigating linear vibration in the y-direction provides the most optimal solutions for implementing CDA modes. Methods herein can consist or comprise setting an upper and lower boundary and operating CDA on certain cylinders within the upper and lower boundaries. A first method can comport with FIG. 4A, wherein once the engine has "keyed on" and reached idle or above at step 410, a CDA mode can be implemented in step 403. If the engine is "keying off" (shutting down), then in step 402 the ECU 1000 can select whether and when to deactivate all cylinders.

When an in-line multiple-cylinder diesel combustion engine 100, 102 in the engine system is operating at an engine speed at or above idle, as by rotating a crankshaft 101 connected to pistons 105 in the in-line multiple-cylinders 1-6 or 1-4, it is possible to implement a cylinder deactivation mode. The working engine can comprise, in a first example, a periodic frequency output at the flywheel 200 above about 15 Hertz+/−1.5 Hertz and below about 30-40 Hertz+/−1.5 Hertz or else selecting a full cylinder firing mode.

Figure 7A:
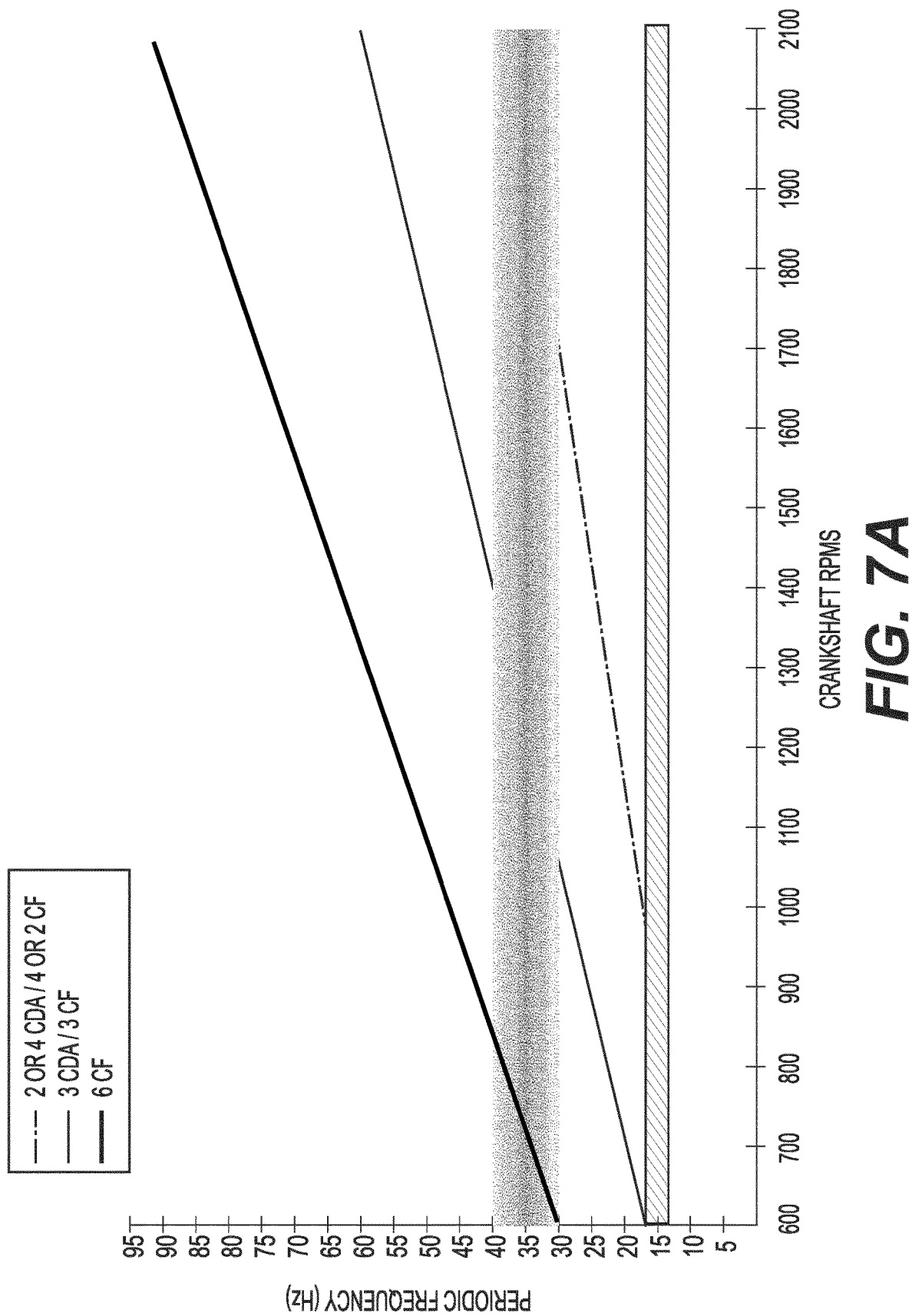
FIGS. 7A & 7B illustrate additional cylinder deactivation mode implementation switching strategies related to periodic frequency output of the in-line engine and engine speed.

A wide secondary resonant frequency band in shown in FIG. 7A, because the exact location of the secondary resonant frequency of the engine system can occur near 35 Hertz, but with some deviations caused by engine system variations (add-ons, accessories, body type/chassis, etc.). So, FIG. 7A applies to more engine systems while FIG. 1A has a narrow secondary resonant frequency band representative of most engine systems. The band is +/−1.5 Hertz in FIG. 1A to permit reasonable deviations from the mean of 35 Hertz. FIG. 7A is also+/−1.5 Hertz to permit reasonable deviations from the general band of 30-40 Hertz. Most in-line diesel engine systems will have a secondary resonant frequency within the general band of 30-40 Hertz. As another example, FIG. 7B has a "high ceiling" for the secondary resonant frequency band, which occurs near 40 Hertz+/−1.5 Hertz.

Figure 1A:
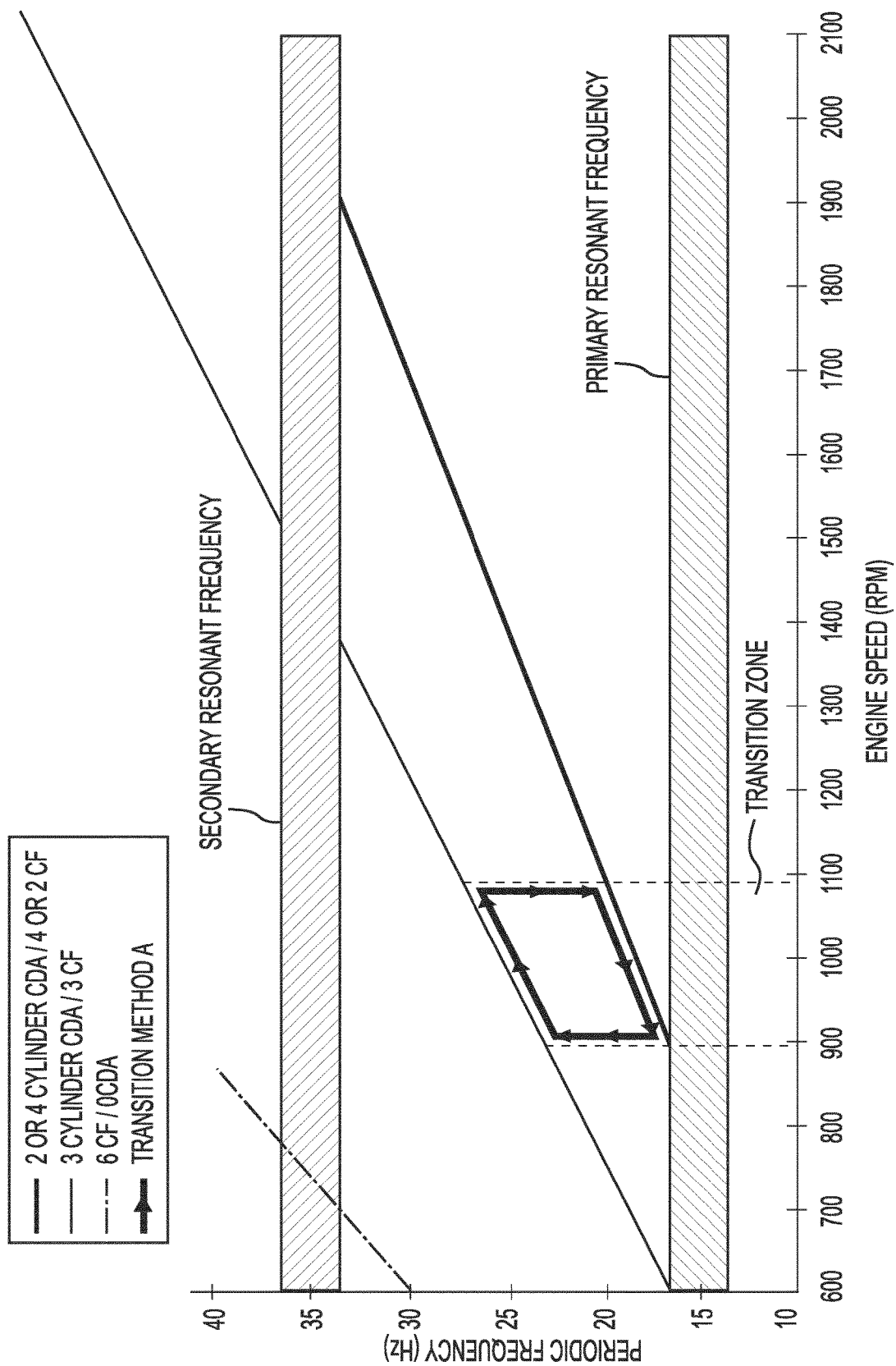
FIGS. 1A-1D illustrate cylinder deactivation mode implementation strategies related to periodic frequency output of an in-line engine and engine speed.
Figure 6A:
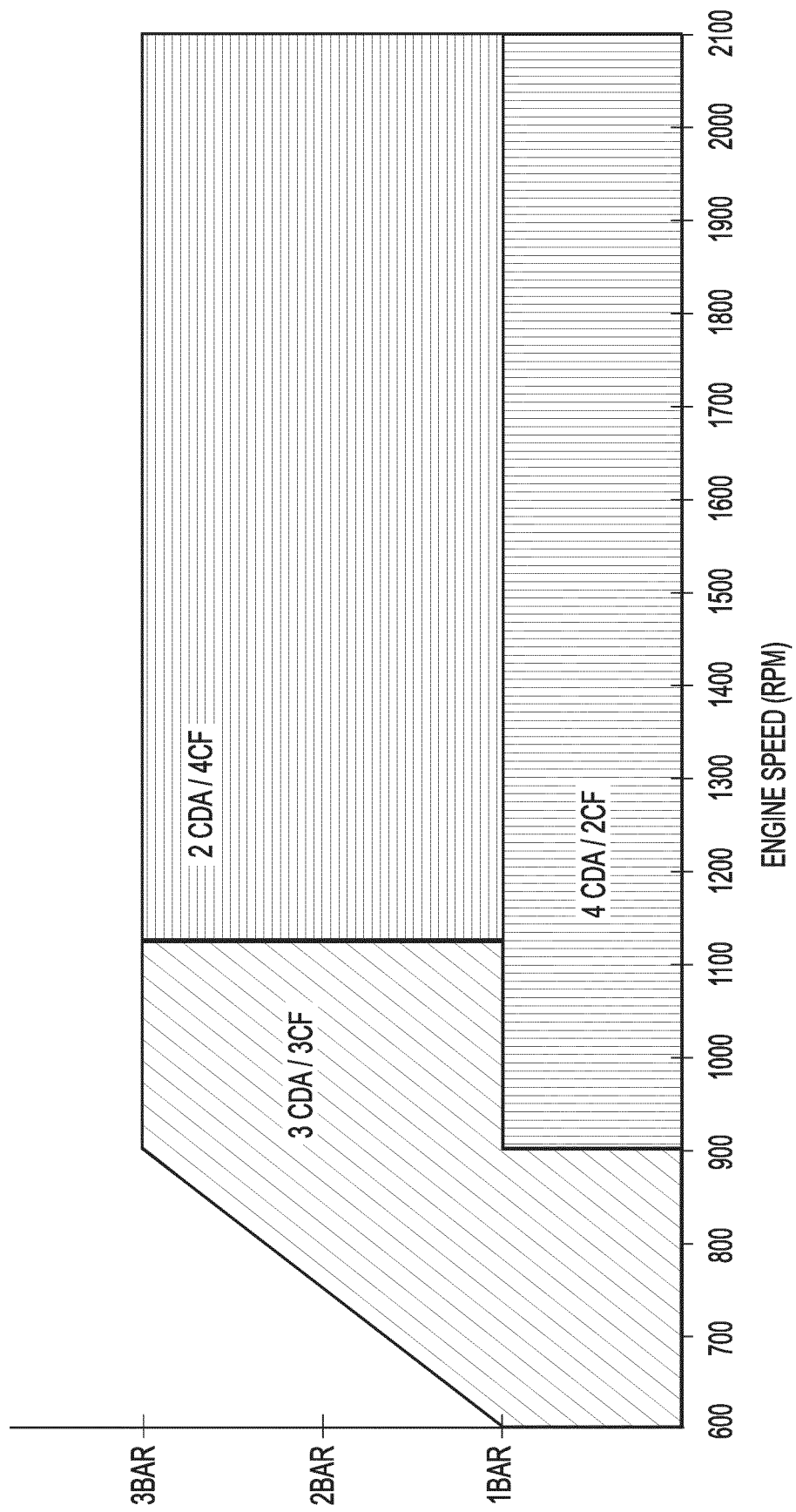
FIGS. 6A & 6B illustrates additional cylinder deactivation mode implementation strategies related to Bar BMEP output of the in-line engine and engine speed.
Figure 6B:
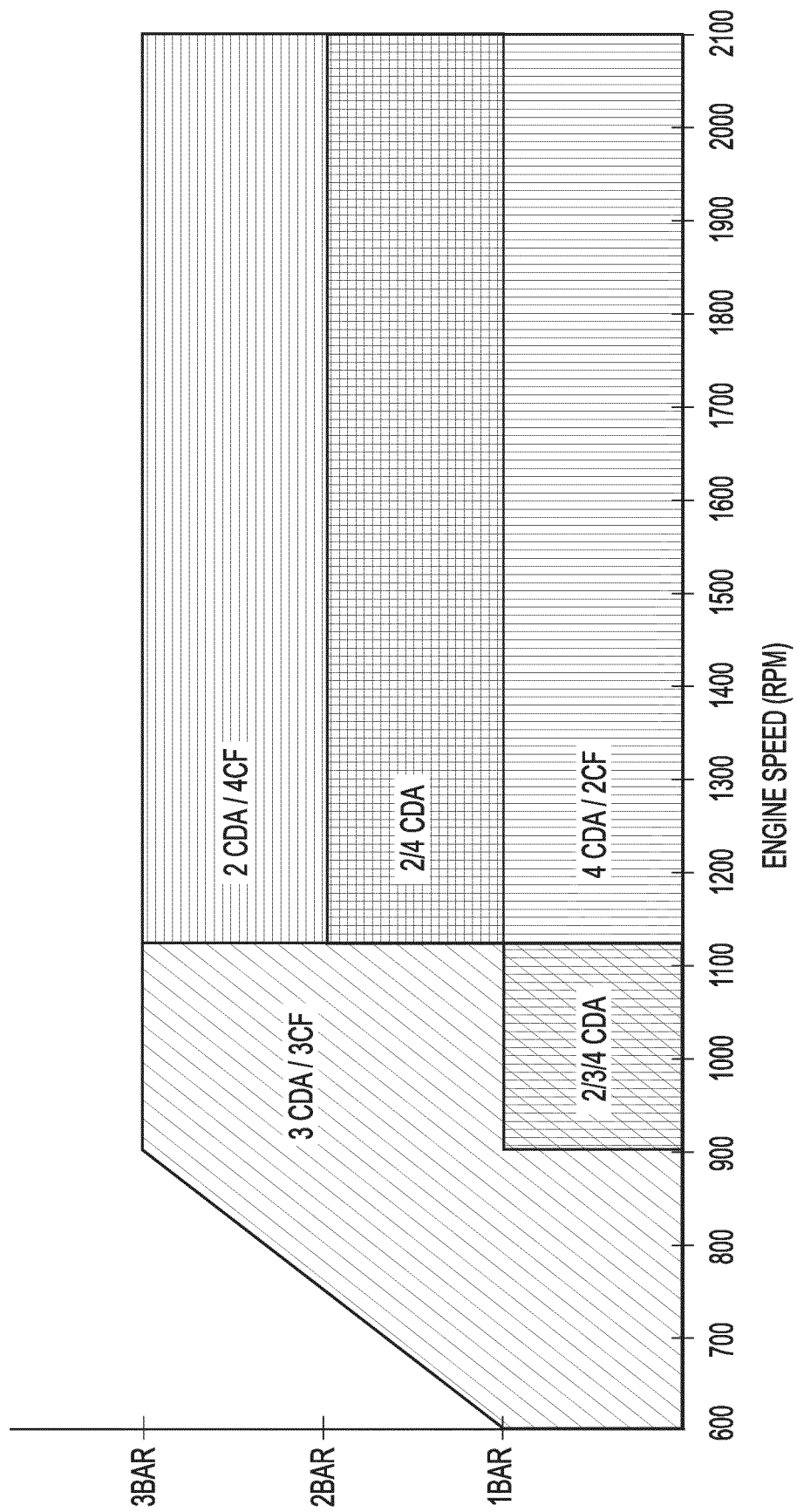

In FIG. 1A, this would result in operating in 3 cylinder CDA mode, leaving 3 cylinders firing (3 CF) and three cylinders deactivated, from idle up to about 1350 rotations per minute (RPMs) of the crankshaft so long as the load output can be achieved (see examples of FIGS. 6A & 6B and discussion of 4 Bar BMEP). This can also result in operating in one of 2 cylinder CDA mode with 4 cylinders firing and 2 cylinders deactivated, or 4 cylinder CDA mode with 2 cylinders firing and 4 cylinders deactivated from about 900 RPMs to about 1800-1900 RPMs. The slanted lines in FIG. 1A represent the frequency output due to the diesel engine operating in the listed cylinder firing (CF) and cylinder deactivation (CDA) modes. But, there can be resonances anywhere in the diesel system. Staying between the primary resonant frequency band and the secondary resonant frequency band ensures that the engine system receives NVH from the diesel engine that can be readily received without large overhaul of the engine system.

It is possible to restrict the use of CDA to only that portion of the CDA lines between the primary and secondary boundaries. Or, it is possible to use the 3 cylinder CDA at engine speeds that result in the diesel engine outputting frequencies above the secondary resonant frequency. So, it is possible to implement the cylinder deactivation mode, consisting of firing half (3) of the multiple cylinders of the 6-cylinder engine while deactivating the other half (3) of the multiple cylinders from about 600 RPMS to about 1350 RPMs and from about 1500 RPMs up to the engine's top speed or up to the point that the engine output can no longer reach the load output demand for the engine system. It is also possible to switch between half-engine CDA mode and the 2 or 4 cylinder CDA modes between about 1500 RPMS and about 1800-1900 RPMs, with switching being dependent on whether the load output can be met. In the example of FIG. 1A, there is only one CDA mode, the half-engine (3 cylinder) CDA mode, available beyond about 1800-1900 RPMs.

Because cylinder deactivation implementation can be load-dependent, it can be possible to select and implement a cylinder deactivation mode consisting of firing one third (2 of 6) of the cylinders or two thirds (4 of 6) of the cylinders of the multiple cylinders while deactivating the remaining multiple cylinders (4 or 2, respectively, for a 6-cylinder engine). These CDA modes can be done from about 900 RPMs to about 1900 RPMs. And, when the engine is rated to go beyond 2100 RPMs as a top speed, these CDA modes can be implemented above the secondary resonant frequency so long as the diesel engine can supply the desired load output for the engine system at those rotations per minute (RPMs).

As set forth in more detail in FIGS. 6A & 6B, the implementation of CDA modes can relate to the load output desired. So, the method can comprise switching among the one third cylinder firing mode, the half-engine cylinder firing mode, and the two third cylinder firing mode. This is particularly possible when the engine speed is between about 900 and 1100 rotations per minute of the crankshaft. In this transition zone, it can be possible for the diesel engine to achieve all desired load outputs at at least one engine speed or at a range of engine speeds within the transition zone. Or, at least the diesel engine can achieve all desired load outputs below 3 or 4 Bar BMEP at at least one engine speed or at a range of engine speeds within the transition zone. At other engine speeds outside the transition zone, it can be possible that only one CDA mode is available for selection and implementation, or it can be possible that two CDA modes are available for selection or implementation, these two CDA modes being load-dependent.

So, selecting and implementing a CDA mode in any one of steps 403, 405, 407 or 415 can comprise a step such as step 505, wherein the desired Brake Mean Effective Pressure (BMEP) (measured in Bars) output of the diesel engine 100, 102 is considered by the ECU 1000. (The steps of FIG. 5 can be combined into the processes of FIGS. 4A-4D.) Processing in a processor can occur. Either a lookup table or real time processing can determine the load that the diesel engine must satisfy. The load data can be processed and correlated to the capabilities of the diesel engine and the available CDA modes.

In general, the principals of FIGS. 1A-1D, 7A & 7B will work at or below 3 Bar BMEP. In some circumstances, they will work at or below 4 Bar BMEP. Methods of diesel engine and diesel system operation at or below 4 Bar BMEP are not excluded from the scope of the relevant claims, despite the working examples and several specific claims focusing on 3 Bar BMEP.

So, the methods herein can further comprise processing an engine load parameter and determining that the engine load is at or less than 3 Bar BMEP or at or less than 4 Bar BMEP prior to selecting or implementing a CDA mode.

Turning to FIG. 6A, it can be seen that there is a range from idle (600 RPMs) to about 900 RPMs where only one CDA mode can be selected or implemented: 3 cylinder CDA having 3 cylinders firing. Between about 900 RPMs and 1100 RPMs, two CDA modes can be selected or implemented: the 3 cylinder CDA or a 4 cylinder CDA having 2 cylinders firing. Between about 1100 RPMs and the upper speed limit of the diesel engine (in this example 2100 RPMs), a different set of two CDA modes can be selected or implemented: the 4 cylinder CDA or a 2 cylinder CDA having 4 cylinders firing.

It is possible to enter a six-cylinder firing mode when none of the two-cylinder CDA mode, the four-cylinder CDA mode, nor the three-cylinder CDA mode can meet the load output requirement of the diesel engine system. This subjects the system to the primary powertrain resonant frequency for which it was designed (6 cylinder firing and 0 cylinder CDA line) and avoids CDA modes for that time where no CDA mode can meet the load requirement. Conversely, when no load is required, it is possible to deactivate all cylinders, thus implementing a 6-cylinder deactivation mode In FIG. 6B, there are overlapping zones where additional CDA modes are available within the RPM bands. Now, additional considerations can be joined in the decision trees, such as fuel savings or thermal or pollution management, among others. In FIG. 6B, there continues to be a range from idle (600 RPMs) to about 900 RPMs where only one CDA mode can be selected or implemented: 3 cylinder CDA having 3 cylinders firing. Between about 900 RPMs and 1100 RPMs, three CDA modes can be selected or implemented: the 3 cylinder CDA, a 4 cylinder CDA having 2 cylinders firing, or a 2 cylinder CDA having 4 cylinders firing. Between about 1100 RPMs and the upper speed limit of the diesel engine all three CDA modes can be selected or implemented, however, the selection and implementation is dependent upon the desired engine output. So, below 1 Bar BMEP, 4 cylinder CDA is most desirable. Between 1 and 2 Bar BMEP, 2 cylinder CDA or 4 cylinder CDA are desirable. Above 2 Bar BMEP, and in instances up to 4 Bar BMEP, 2 cylinder CDA is used. However, for conciseness, up to 3 Bar BMEP, 2 cylinder CDA is illustrated.

Additional method steps consistent with the disclosure can be achieved. For example, the methods disclosed herein can comprise processing an engine load parameter and, when the engine load is less than 1 Bar BMEP, implementing a one third cylinder firing mode, but switching to one of the half-engine cylinder firing mode and the two third cylinder firing mode when the engine load is greater than 1 Bar BMEP. In another method, steps can comprise processing an engine load parameter and, when the engine load is less than 1 Bar BMEP, implementing a one-third cylinder firing mode, but switching to the half-engine cylinder firing mode when the engine load is greater than 1 Bar BMEP.

Yet another method can comprise processing an engine load parameter and determining that the engine load is less than 3 Bar BMEP and processing an engine speed parameter and determining that the engine speed is greater than about 1100 rotations per minute of the crankshaft. This method can further comprise processing an engine load parameter and, when the engine load is less than 1 or 2 Bar BMEP, implementing a one third cylinder firing mode, but switching to the two third cylinder firing mode when the engine load is greater than 1 or 2 Bar BMEP.

In another method, additional steps can be accomplished as follows: processing an engine speed parameter and determining that the engine speed is between about 600 and 900 rotations per minute of the crankshaft, and implementing the cylinder deactivation mode consisting of firing half of the multiple cylinders while deactivating the other half of the multiple cylinders. Additional steps can comprise processing an engine load parameter and determining that the engine load is less than 3 Bar BMEP, processing an engine speed parameter and determining that the engine speed is greater than about 900 rotations per minute of the crankshaft, and implementing the cylinder deactivation mode consisting of firing one third or two thirds of the multiple cylinders while deactivating the remaining multiple cylinders.

Figure 1B:
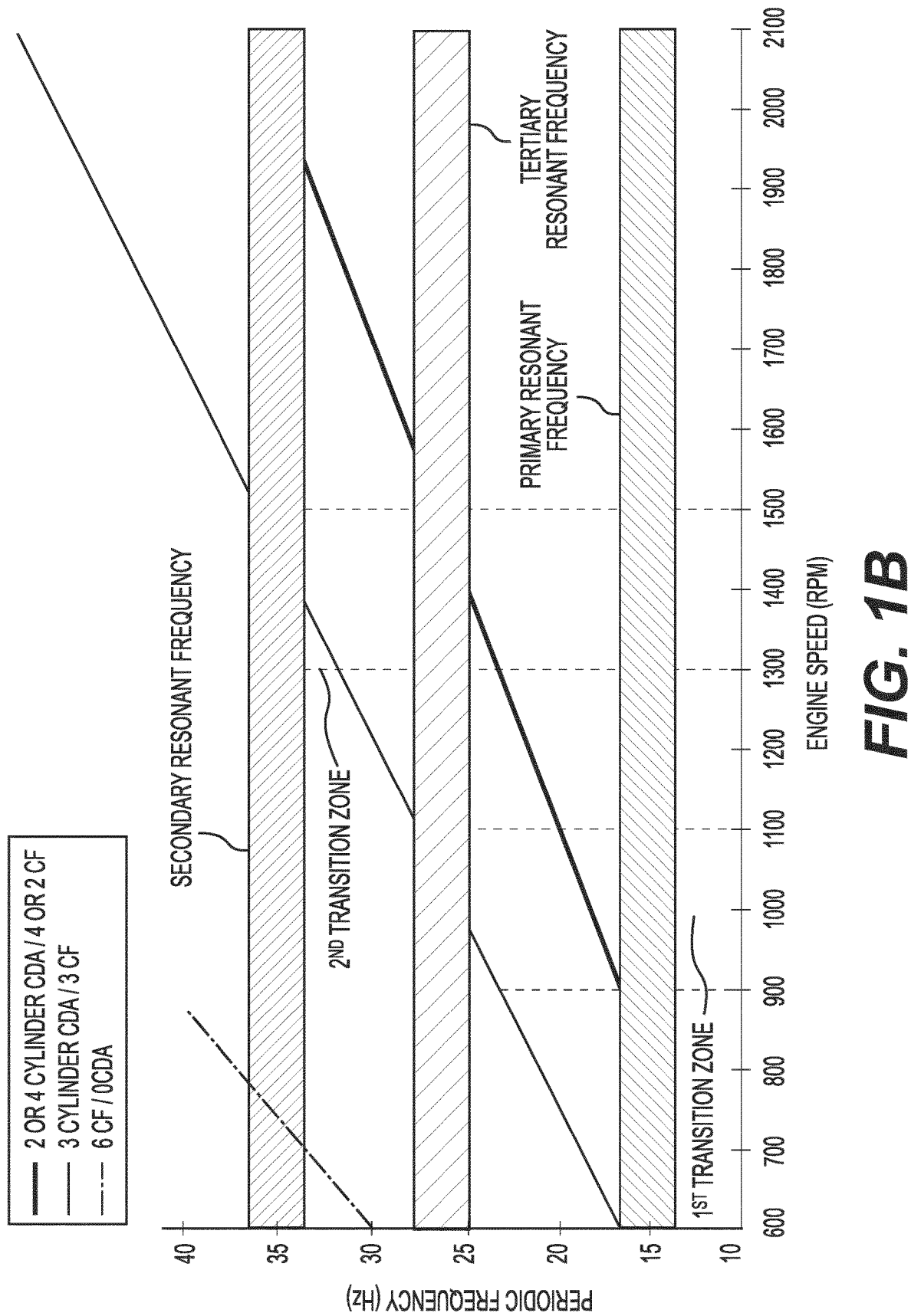

Now, additional methods can be understood from FIG. 1A. It can be understood that it is desired to use 3 cylinder CDA from idle to about 1100 RPMs and then switch to 2 cylinder CDA or 4 cylinder CDA. If the load output cannot be met, then 6 cylinder firing (0 cylinders CDA) can be implemented. In FIG. 1D, a different range for the method is expressed, as FIGS. 6A and 6B are exemplary and not totally restrictive. In FIG. 1D, it is possible to select and implement 3 cylinder CDA from idle to about 1200 RPMs and then switch to 2 cylinder CDA or 4 cylinder CDA up to about 1700 RPMs as engine load output permits. If the engine load output cannot be met, then 6 cylinder firing (0 cylinders CDA) can be implemented. So, selecting cylinders for cylinder deactivation can comprise selecting one of half of the multiple cylinders, one third of the multiple cylinders, or two thirds of the multiple cylinders for cylinder deactivation while firing the remaining multiple cylinders. And, consistent with FIGS. 6A & 6B, implementation of a compact periodic frequency zone is compatible with a method comprising processing an engine load parameter and, when it is determined that the engine load is less than 3 Bar BMEP, implementing the selected cylinder deactivation but, when it is determined that the engine load is greater than 3 Bar BMEP, implementing a full cylinder firing mode.

FIG. 1D discloses the concept of a compact periodic frequency zone which can be implemented to reduce the onerous burden on OEMs to implement cylinder deactivation. Using the compact periodic frequency zone (or "compact periodic frequency band"), the testing needed before adding cylinder deactivation to a diesel engine system can be reduced. While it is possible to use 3 cylinder CDA from idle to about 1400 RPMs and from about 1500 RPMs to the top engine speed without outputting deleterious NVH, it is possible to sub-select and restrict implementation of 3 cylinder CDA to between idle and about 1200 RPMs and then switch to 2 cylinder CDA or 4 cylinder CDA from about 1200 RPMs to about 1700 RPMs. In this scenario, CDA is not used or made available to the whole active engine operating range. The engine operates above about 1700 RPMs only in 6 cylinder firing mode. An optimization takes place. CDA modes are used in a compact zone where CDA is least likely to have a frequency output that adds deleterious resonance to the engine system. The range of resonances that can be excited by CDA modes can be made smaller.

By sub-selecting even farther, additional work on the engine system designer can be removed. This can be done by using the 3 cylinder CDA to between idle and about 1200 RPMs and then switching only to 4 cylinder CDA from about 1200 RPMs to about 1700 RPMs.

The sub-selecting and use of the compact periodic frequency band is not insignificant. Normally, an OEM quantifies any resonant frequencies of the whole system. In the examples of the Figures, this can be a 60 Hertz span of data collection and analysis for the 6 cylinder firing mode alone. When adding cylinder deactivation to the system, additional data needs to be collected to become a commercially viable embodiment. Limiting the testing to a small band of, for example 15 Hertz, alleviates significant data collection and analysis and eliminates the overlap of CDA mode NVH on 6 cylinder firing mode NVH. The CDA modes can be in a distinct band, the compact periodic frequency band, separate from the all-cylinder firing mode. This makes a neater package for the OEM.

In the technique of FIG. 1D, the method can comprise designating a first resonance of the engine system a primary boundary, designating a second resonance of the engine system a secondary boundary, and selecting cylinders for cylinder deactivation so that the periodic frequency output of the engine is within a compact frequency band.

Figure 4B:
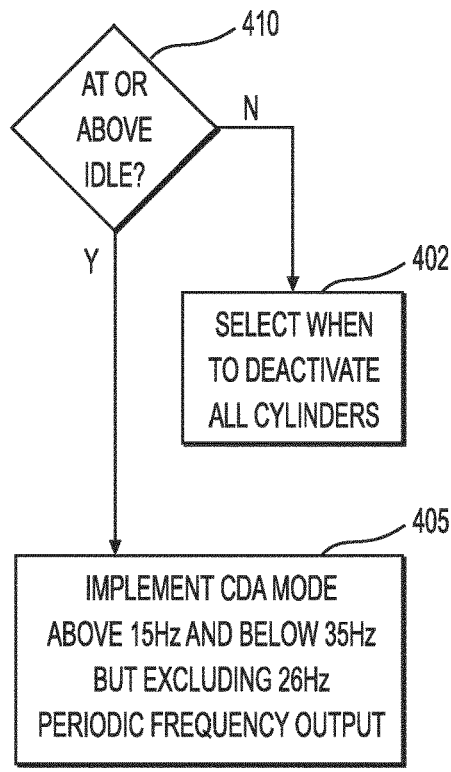
Figure 4C:
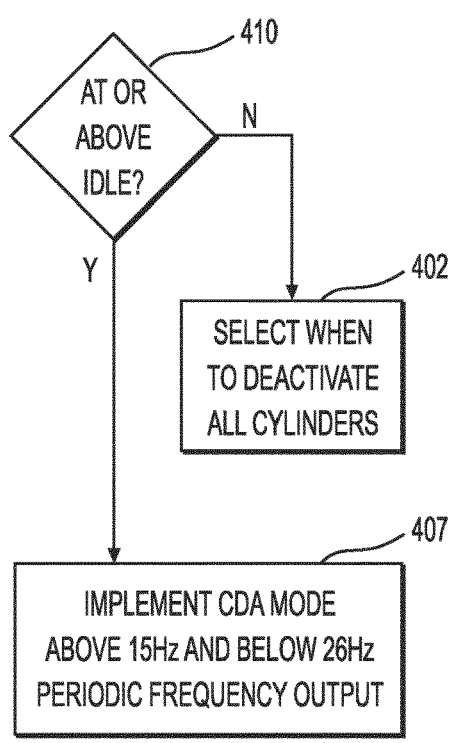
Figure 4D:
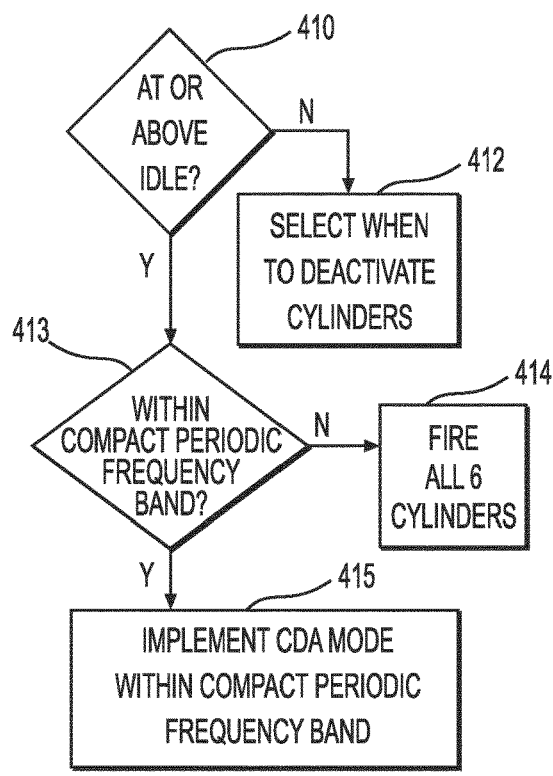

In the context of FIG. 4D, the method of applying a compact frequency band can comprise determining whether the engine is at or above idle in step 410. As in the other methods, if the engine is keying off, then in step 412, the ECU 1000 can select when or whether to deactivate all cylinders. (All cylinder deactivation is also a complementary mode in all methods herein for assisting coasting, platooning, or motoring.) ECU 1000 can comprise stored algorithms and processing capabilities for determining if the engine system is operating in a range where the CDA modes can output a frequency within the compact frequency band in step 413. If the engine is outside the desired operating range, for example, above about 1700 RPMs or greater than 3 Bar BMEP load output required, then 6 cylinder firing is implemented in step 414. But, if the diesel engine will output a frequency within the compact frequency band, then in step 415, a CDA mode is implemented as has been disclosed with respect to the example of FIG. 1D.

A method of selecting cylinders of a multi-cylinder diesel engine in an engine system for deactivation, or an additional method of implementing cylinder deactivation on cylinders of a multi-cylinder diesel engine in an engine system can comprise designating a first resonance around a first periodic frequency output of the engine system as a primary boundary, designating a second resonance around a second periodic frequency output of the engine system as a secondary boundary, and selecting cylinders for cylinder deactivation so that the periodic frequency output of the engine is within a compact periodic frequency band between the primary boundary and the secondary boundary.

The compact periodic frequency band can comprise the primary boundary as a lower boundary. So, the compact frequency band can comprise a lower boundary of about 15 Hertz+/−1.5 Hertz according to FIG. 1D. In other implementations, the compact frequency band can comprise a lower boundary of about 9 Hertz+/−1.5 Hertz, Since one goal of implementing a compact periodic frequency band is to reduce the resonance burden on the engine system in the Y-axis over the entire X-axis of FIG. 1D, the method can comprise bounding the compact periodic frequency band at a periodic frequency that is less than the second periodic frequency output of the engine system. As an example, the compact periodic frequency band can span about 15 Hertz, while the delta between the primary periodic frequency output and the secondary periodic frequency output of the engine system is 20 or more Hertz. So, the method can comprise implementing the compact periodic frequency band to span about 15 Hertz. It is possible to implement the compact periodic frequency band to span about 10 Hertz or some amount between 10 and 15 Hertz.

It is also possible to designate the compact periodic frequency band to comprise a transition zone to switch between deactivating half of the multiple cylinders and deactivating one third of the multiple cylinders around one or both of about 1200 rotations per minute of a crankshaft of the multiple-cylinder diesel engine and about 20 Hertz+/−1.5 Hertz periodic frequency output of the multiple-cylinder diesel engine. The 20 Hertz inflection point for switching between CDA modes can be tied to an engine having a low incidence of resonant frequency output at that inflection point.

Consistent with the example of FIG. 7A, a method herein can comprise the first periodic frequency output at about 15 Hertz+/−1.5 Hertz and the second periodic frequency output at between 30-40 Hertz+/−1.5 Hertz.

According to another example, the first periodic frequency output is about 9 Hertz+/−1.5 Hertz and the second periodic frequency output is about 35 Hertz+/−1.5 Hertz.

Consistent with FIG. 7A, when an engine system comprises a primary periodic frequency around 30 Hertz, it can be possible to switch between 2 or 4 cylinder CDA modes and 3 cylinder CDA mode around 1500 RPMs. Yet, when an engine system comprises a primary periodic frequency around 40 Hertz, it can be possible to switch between 2 or 4 cylinder CDA modes and 3 cylinder CDA mode around 1800 RPMs.

Figure 1C:
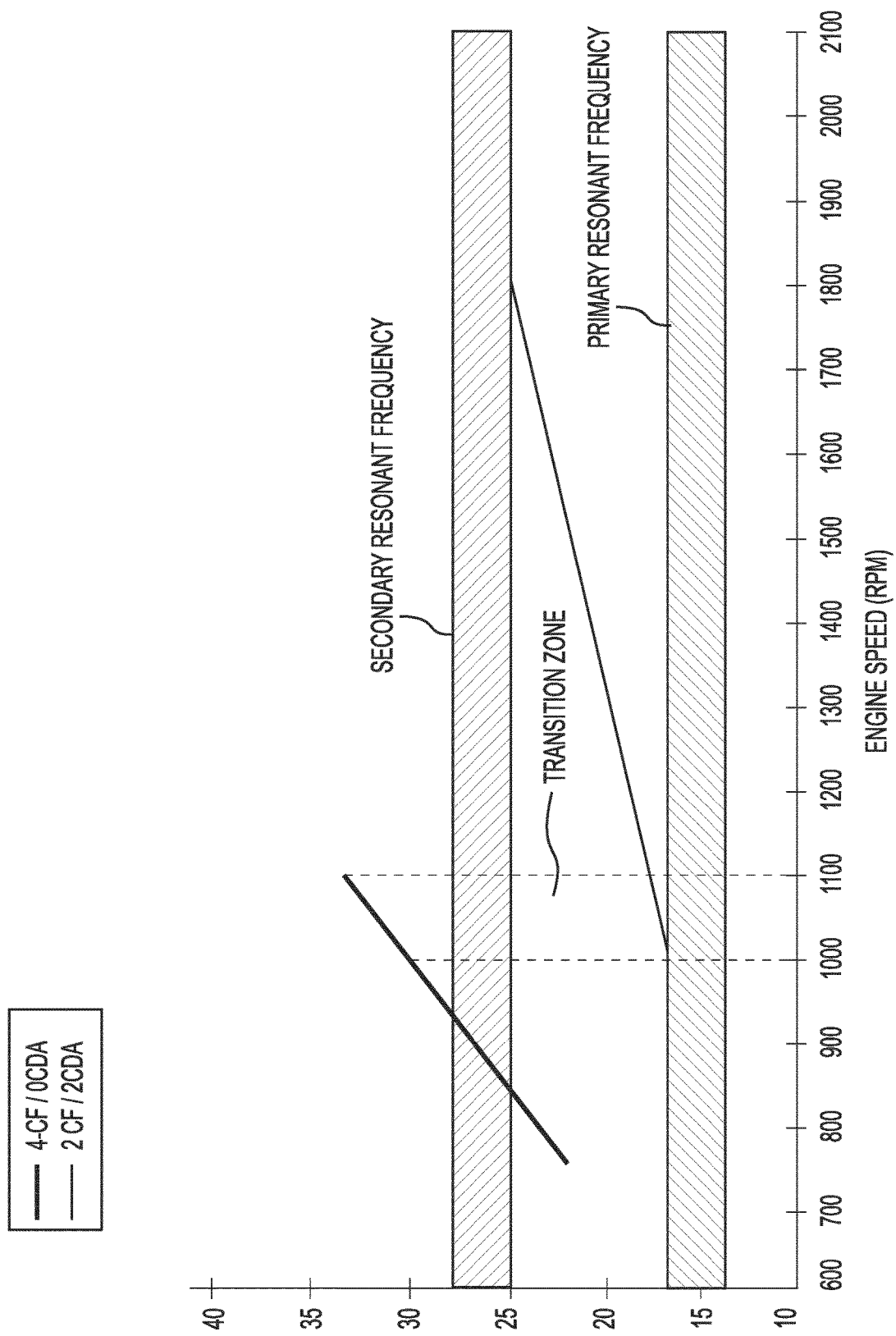
Figure 1D:
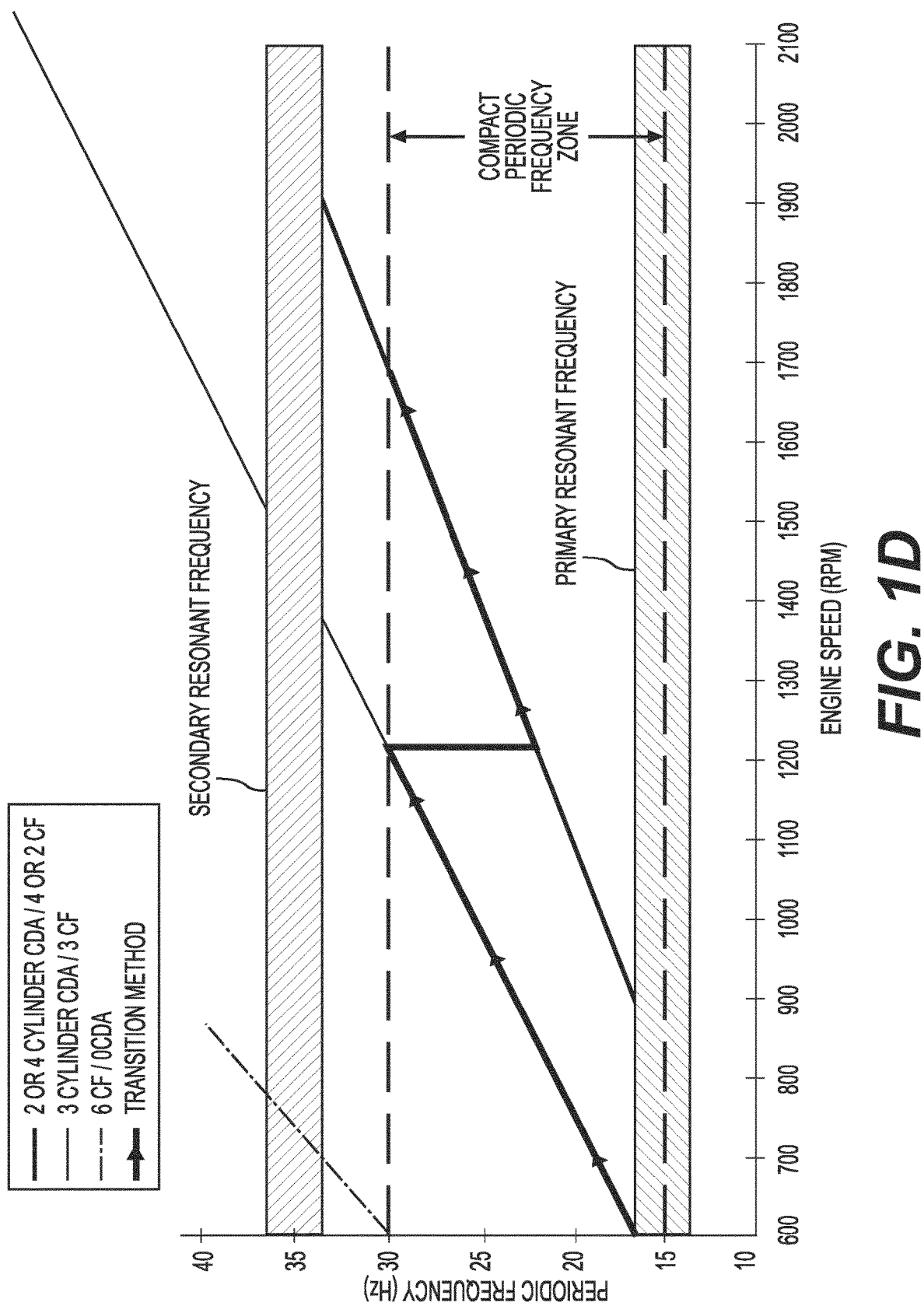

Turning to FIGS. 1C and 4C, methods comprising an in-line 4-cylinder diesel engine of FIG. 3B are demonstrated. The frequency output of the engine when all 4 cylinders are firing is shown extending at a first slope. At half of that slope, the half-engine cylinder deactivation mode having 2 cylinder firing and 2 cylinders in CDA is shown. An additional method for compensating for engine roll in an in-line multiple-cylinder diesel combustion engine system can consist or comprise, when the in-line four-cylinder diesel combustion engine is operating at an engine speed above about 900 rotations per minute of a crankshaft connected to pistons in the four cylinders (step 410), implementing a half-engine cylinder deactivation mode comprising a periodic frequency output at a flywheel connected to the crankshaft above about 15 Hertz and below about 25 Hertz (step 407) or else selecting a four cylinder firing mode. In FIG. 1C, the half-engine cylinder deactivation mode originates in implementation around 1000 RPMs, though this is an approximation with the transition zone indicating an approximate point where the engine can switch from all-cylinders firing to half-engine CDA mode with 2 cylinders firing.

In FIG. 1C, there is no use of half-engine CDA above the secondary resonant frequency because the engine is not able to meet the load output requirement at higher RPMs than about 1700-1800 RPMs and also avoid the secondary resonant frequency band. It is probable in this example that the frequency output of the engine would add deleterious resonance to the engine system, and so no CDA modes are implemented in the example above the secondary resonant frequency. Were it possible to have a larger operating range of the engine past 2100 RPMs, and were the load outputs of the engine usable, then half engine CDA mode could be used with frequency outputs above the secondary resonant frequency.

Figure 7B:
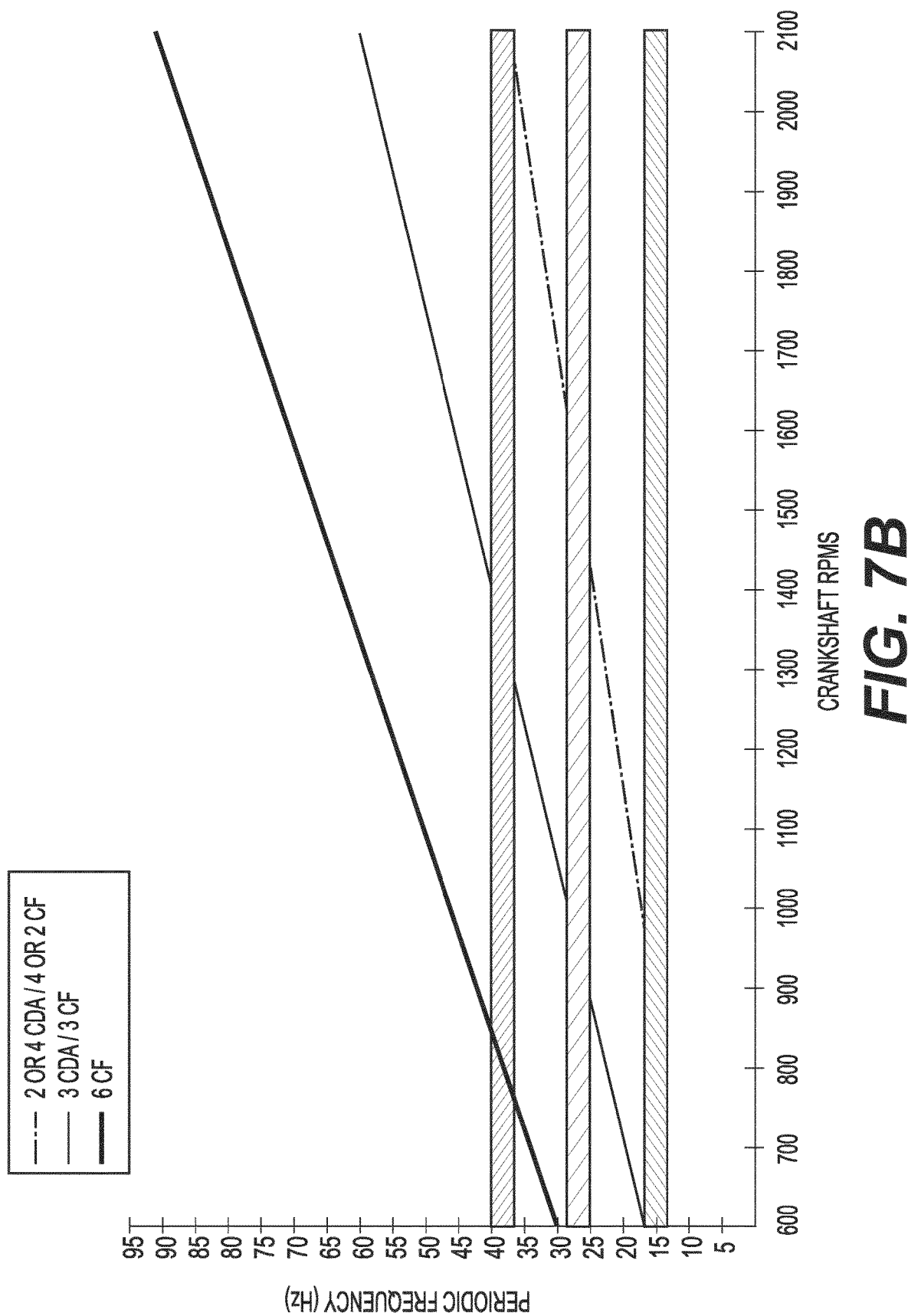

Turning to FIGS. 1B, 4B, and 7B, additional concepts are disclosed that can be implemented to adjust the methods herein. In these Figures, a tertiary resonant frequency is included. Not all engine systems will have such a band or require consideration of it when it is present. However, some engine systems will require that CDA modes be avoided near this tertiary resonant frequency. The primary resonant frequency can be thought of as the strongest frequency to avoid, and the tertiary resonant frequency can be equal to other resonant frequencies in the engine system or be the third strongest frequency to avoid. So, the methods herein can comprise a step 407 for implementing a cylinder deactivation mode that excludes a tertiary periodic frequency output at the flywheel 200 connected to the crankshaft 101 of about 25-26 Hertz+/−1.5 Hz. FIG. 1B places the secondary periodic frequency about 35 Hertz+/−1.5 Hertz, while FIG. 7B places the secondary periodic frequency about 40 Hertz+/−1.5 Hertz. The primary periodic frequency is about 15 Hertz+/−1.5 Hertz in both FIGS. 1B & 7B, although, as mentioned elsewhere, the primary periodic frequency for some engine systems can be about 9 Hertz+/−1.5 Hertz.

Now, in FIG. 1B, a first transition zone can comprise a switching between 2 cylinder CDA, 3 cylinder CDA, 4 cylinder CDA, or 6 cylinders firing. For some load output requirements, it is necessary to drop down to a lower periodic frequency output but jump up to a higher number of cylinders active to provide any CDA mode that avoids excitation of a tertiary or secondary resonant frequency band. At some RPMs in the first transition zone, 3 cylinder CDA is not available at all. If 4 cylinder CDA is not available for Bar BMEP reasons, then only 2 cylinder CDA or 6 cylinders firing are available for implementation.

In the second transition zone of FIG. 1B, there are engine speeds where no CDA modes are available without exciting deleterious resonance, and so only 6 cylinder firing mode is available. The advantage of the compact periodic frequency band can be seen, as implementing the strategy can be used to avoid processing NVH at the tertiary resonant frequency. For example, the compact periodic frequency band can be implemented between about 15 Hertz and about 25 Hertz, such that CDA modes above about 25 Hertz are excluded from the implementation methods. Then, CDA is implemented in this example between idle and about 1350 RPMs.

Without the compact periodic frequency band, there are more complications to correlating engine speed to available CDA modes. As, in this example, there are engine speeds within the send transition zone where no CDA modes are available. Only 6 cylinders firing mode is available. Outside the second transition zone, CDA modes again become available.

FIG. 7B has some similarities to FIG. 1C in that there is no use of one of the CDA modes (2 or 4 cylinder CDA) above one of the resonant frequency bands (in this case, the tertiary resonant frequency band). Were the load outputs of the engine usable, and were the range of the engine speed extended so that the frequency output for the 2 or 4 cylinder CDA modes could extend out of the tertiary resonant frequency, then the 2 or 4 cylinder CDA modes could be used with frequency outputs above the tertiary resonant frequency.

FIGS. 7A & 7B both show that it is possible to use at least one CDA mode, the half-engine CDA mode, at frequency outputs above the secondary resonant frequency band. So long as the engine is able to meet the load output requirement at higher RPMs than about 1350 RPMs and also avoid the secondary resonant frequency band, then a CDA mode can be selected and implemented for the entire upper operating range of the engine speed. FIG. 7A shows that the whole engine operating range, from idle to governed, has at least one CDA mode available for implementation. FIG. 7B shows that almost the whole engine operating range, from idle to governed has at least one CDA mode available for implementation. Thus, commercially feasible methods for implementing CDA modes has been achieved.

FIGS. 7A & 7B illustrate a generalization that the frequency output of the 3 cylinder CDA mode presents at roughly half the slope of the 6 cylinder firing frequency output. And, the 2 cylinder CDA and 4 cylinder CDA modes present at roughly one third of the slope of the 6 cylinder firing frequency output. Such a general principal can be used to apply the methods disclosed herein to other diesel engines in other diesel engine systems. For example, by discovering the resonant frequency bands of another diesel engine system operating with all cylinders firing, and by knowing the slope of the all-cylinder firing engine frequency output with respect to the resonant frequency bands, it is possible to extrapolate the frequency outputs of the CDA modes available for that engine in that engine system and thus apply the methods of primary, secondary and tertiary boundaries, among other extrapolations.

Additional variations in the methods disclosed herein can occur. For example, while the idle engine speed is shown in the figures as about 600 rotations per minute of the crankshaft, it is possible that other idle speeds are used in practice, such as 500, 550, or 650 RPMs, as examples. The idle speed can be other than that drawn. Likewise, the upper limit of the engine speed can extend past 2100 RPMs to, for example 2500 RPMs. Or, the top engine speed can be restricted to, for example 1700 RPMs. So, the operating range for the engine speed is not entirely limiting unless so claimed.

Figure 5:
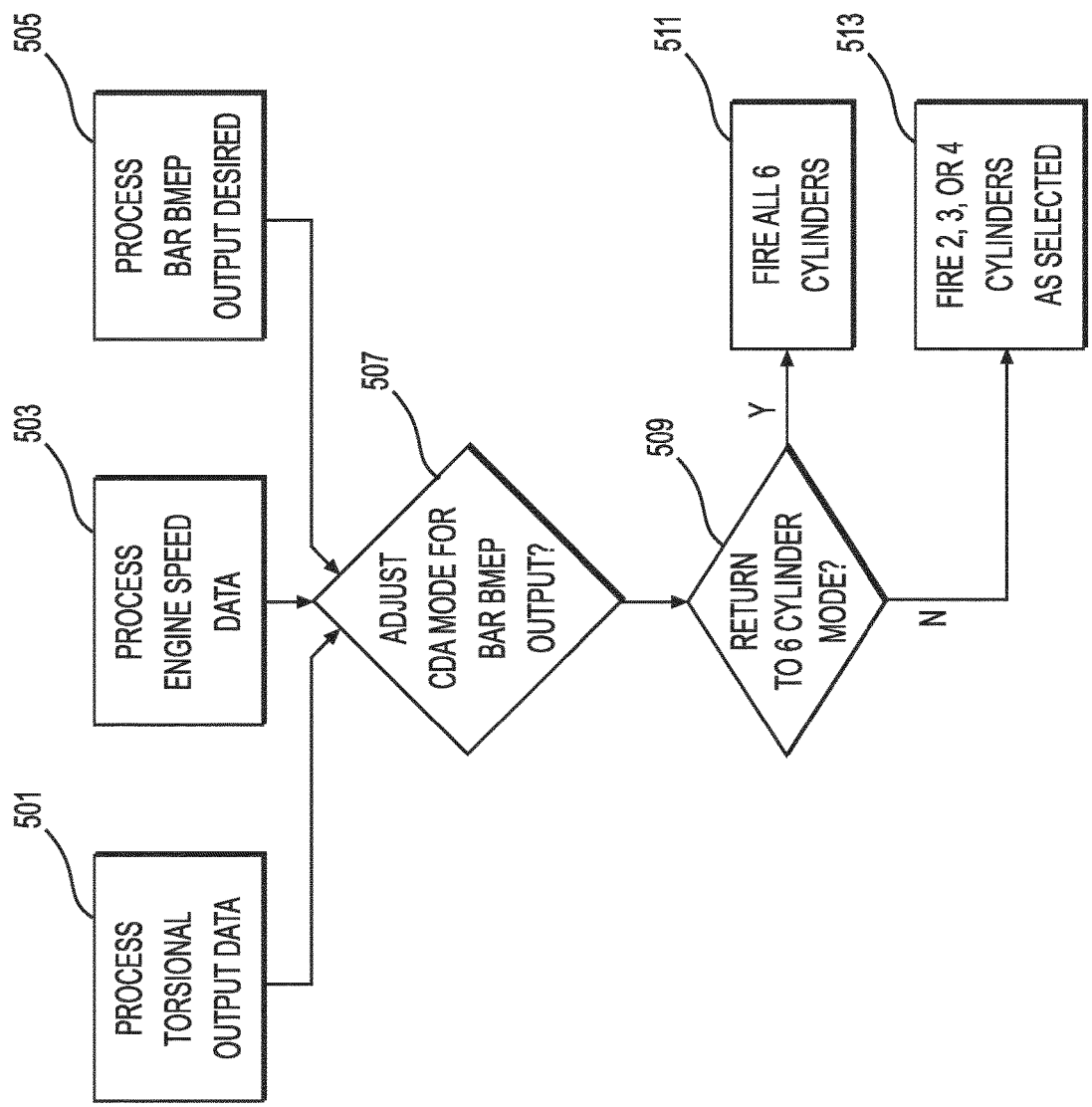
FIG. 5 is an exemplary cylinder deactivation mode implementation sub-strategy.

Optional aspects are included in FIG. 5. The methods can optionally include or require some or all of steps 501, 502, 503. A step can be included for processing engine speed data in step 503 (engine speed can be directly measured, approximated, or derived from other measurements to be processed by ECU 1000) so that CDA mode can be selected or switched (adjusted) in step 507 as changes in engine speed are processed. Likewise, the BMEP output desired of the diesel engine can be processed in step 505 (BMEP can be directly measured, approximated, or derived from other measurements to be processed by ECU 1000; BMEP can be measured in other than Bar, though that unit is used herein throughout; alternatives to BMEP can be processed in the methods herein, including such as Kilowatt hours, transmission gear selection or auxiliary device selection or deselection, which can be used to approximate desired load output of the engine). As discussed, the load output required of the engine can be a parameter for adjusting the CDA mode among some or all of 2 cylinder CDA mode, 3 cylinder CDA mode or 4 cylinder CDA mode.

As another optional aspect of FIG. 5, step 501 can comprise limiting the implementation of the cylinder deactivation mode to conditions under 500 radians per second squared torsional output of the engine or else selecting the full cylinder firing mode. So, the additional constraint of torsional output can be used to adjust the CDA mode among some or all of 2 cylinder CDA mode, 3 cylinder CDA mode or 4 cylinder CDA mode. If the torsional output is higher than a threshold such as 400, 500, or 700 radians per second squared at the crankshaft, then it can be possible to return to 6 cylinder firing mode in step 511 to avoid the NVH of the torsional output. If, after processing the data, it is possible to adjust CDA mode or keep a selected CDA mode in step 507, and the decision of 509 indicates that it is not needed to return to all-cylinders firing mode, then the selected CDA mode can be implemented in step 513 with the corresponding number of fired cylinders being fired.

Other implementations will be apparent to those skilled in the art from consideration of the specification and practice of the examples disclosed herein.

The invention claimed is:

1. A method for operating a 6-cylinder diesel engine, the method comprising:
monitoring a rotational speed of a crankshaft of the 6-cylinder diesel engine configured to operate at up to 1800 rpm, wherein the 6-cylinder diesel engine operates in a first operating range of 500-1300 rpm, a second operating range of 1300-1500 rpm, and a third operating range of 1500-1800;
selectively firing 2 or 3 or 4 cylinders of the diesel engine per engine cycle when in the first operating range or the third operating range; and when entering the second operating range from the first operating range or the third operating range while firing 3 cylinders of the diesel engine per engine cycle, switching to firing 2 or 4 cylinders of the diesel engine per engine cycle.

2. The method of claim 1, wherein only 2 cylinders of the diesel engine are fired per engine cycle when the diesel engine operates at or below 2 brake mean effective pressure.

3. The method of claim 1, wherein only 4 cylinders of the diesel engine are fired per engine cycle when the diesel engine operates at or below 3 brake mean effective pressure.

4. The method of claim 1, wherein a dominant resonance frequency of the diesel engine caused by firing of the cylinders does not correspond to a resonant frequency of a mechanical mount or a mechanical coupling attached to the diesel engine.

5. The method of claim 4, wherein the resonant frequency of the mechanical mount is about 9 Hz.

6. The method of claim 4, wherein the resonant frequency of the mechanical coupling is about 35 Hz.

7. The method of claim 4, wherein the dominant resonance frequency is between the resonant frequency of the mechanical mount of the diesel engine and the resonant frequency of the mechanical coupling of the diesel engine.

8. The method of claim 4, wherein the dominant resonance frequency is between 11 Hz and about 33 Hz.

9. The method of claim 4, wherein the dominant resonance frequency is greater than the resonant frequency of the mechanical coupling of the diesel engine.

10. The method of claim 4, wherein the dominant resonance frequency is greater than 37.5 Hz.

11. The method of claim 4, wherein only 3 cylinders of the diesel engine are fired per engine cycle when the crankshaft speed of the diesel engine is greater than 500 rpm and less than or equal to 1100 rpm.

12. The method of claim 4, wherein only 3 cylinders of the diesel engine are fired per engine cycle such that the dominant resonance frequency of the diesel engine caused by firing of the cylinders is greater than or equal to 12.5 Hz and less than or equal to 27.5 Hz.

13. The method of claim 12, wherein only 3 cylinders of the diesel engine are fired per engine cycle when the diesel engine operates at or below 3 brake mean effective pressure.

14. The method of claim 1, wherein only 3 cylinders of the diesel engine are fired per engine cycle when the crankshaft speed of the diesel engine is greater than or equal to 1500 rpm.

15. The method of claim 14, wherein only 3 cylinders of the diesel engine are fired per engine cycle when the diesel engine operates at or below 3 brake mean effective pressure.

16. The method of claim 1, wherein only 2 or 4 cylinders of the diesel engine are fired per engine cycle when the crankshaft speed of the diesel engine is equal to or greater than 900 rpm and equal to or less than 1800 rpm.

17. The method of claim 1, wherein only 2 or 4 cylinders of the diesel engine are fired per engine cycle such that the dominant resonance frequency of the diesel engine caused by firing of the cylinders is equal to or greater than 15 Hz.

18. The method of claim 17, wherein only 2 cylinders of the diesel engine are fired per engine cycle when the diesel engine operates at or below 2 brake mean effective pressure.

19. The method of claim 17, wherein only 4 cylinders of the diesel engine are fired per engine cycle when the diesel engine operates at or below 3 brake mean effective pressure.

20. A method for operating a 6-cylinder diesel engine, the method comprising:
selectively firing only 3 cylinders of the diesel engine per engine cycle when a crankshaft speed of the diesel engine is in a first operating range of 500-1100 rpm, and switching to selectively firing either 2 or 4 cylinders when the speed of the diesel engine enters a second operating range of 1100-1800 rpm.

21. The method of claim 20, wherein when only 3 cylinders of the diesel engine are fired per engine cycle, a dominant resonance frequency of the diesel engine caused by firing of the cylinders is equal to or greater than 12.5 Hz and less than or equal to 27.5 Hz.

22. A method for operating a 6-cylinder diesel engine, the method comprising:
selectively firing only 3 cylinders of the diesel engine per engine cycle when a crankshaft speed is in a first operating range of between about 500 rpm and about 900 rpm and switching to selectively firing only 2 or 4 cylinders of the diesel engine per engine cycle when a crankshaft speed of the diesel engine enters a second operating range of between about 900 rpm and about 1800 rpm.

23. The method of claim 22, wherein only 2 cylinders of the diesel engine are fired per engine cycle when the diesel engine operates at or below 2 brake mean effective pressure.

24. The method of claim 22, wherein only 4 cylinders of the diesel engine are fired per engine cycle when the diesel engine operates at or below 3 brake mean effective pressure.

* * * * *